Patented Oct. 21, 1952

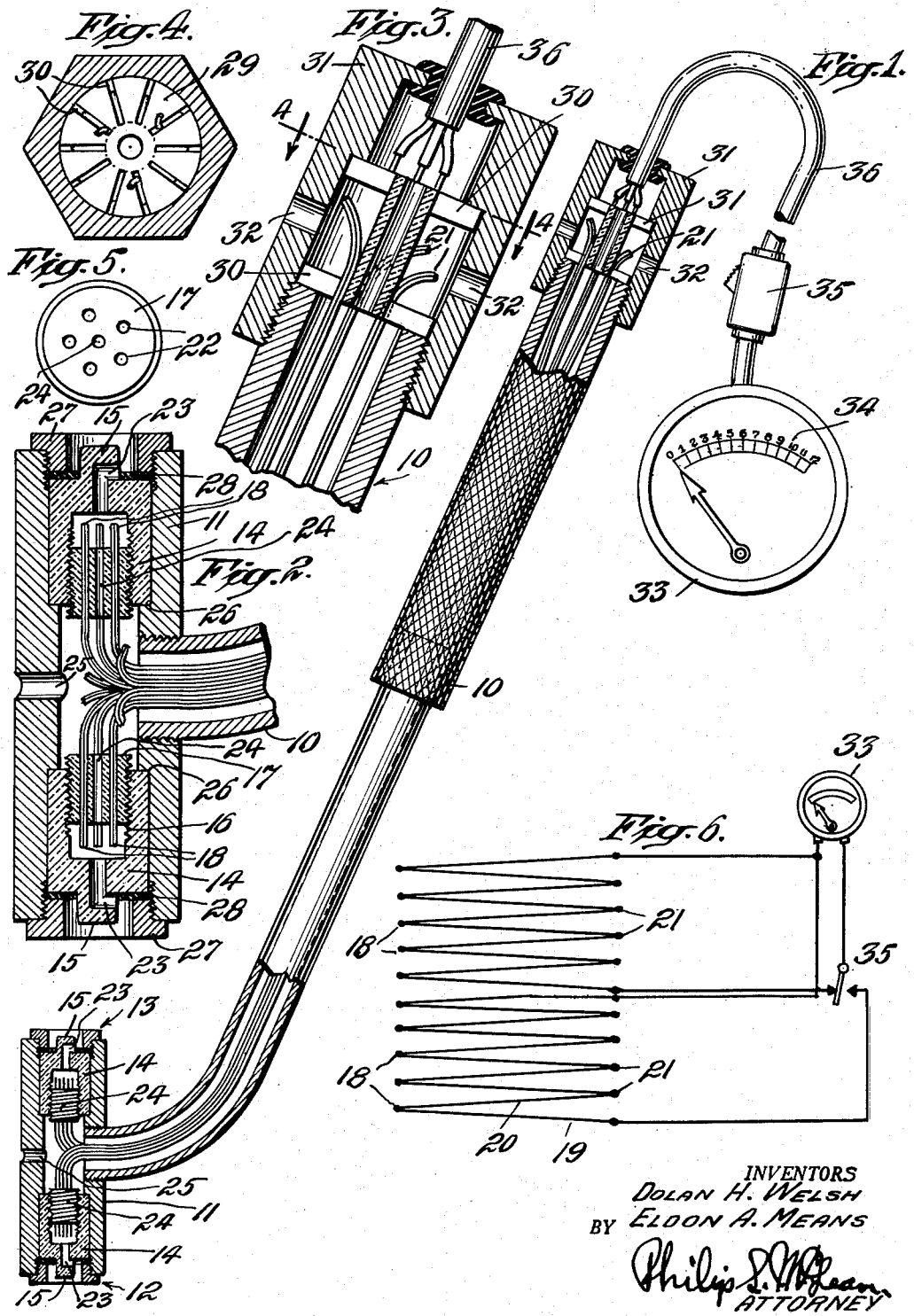

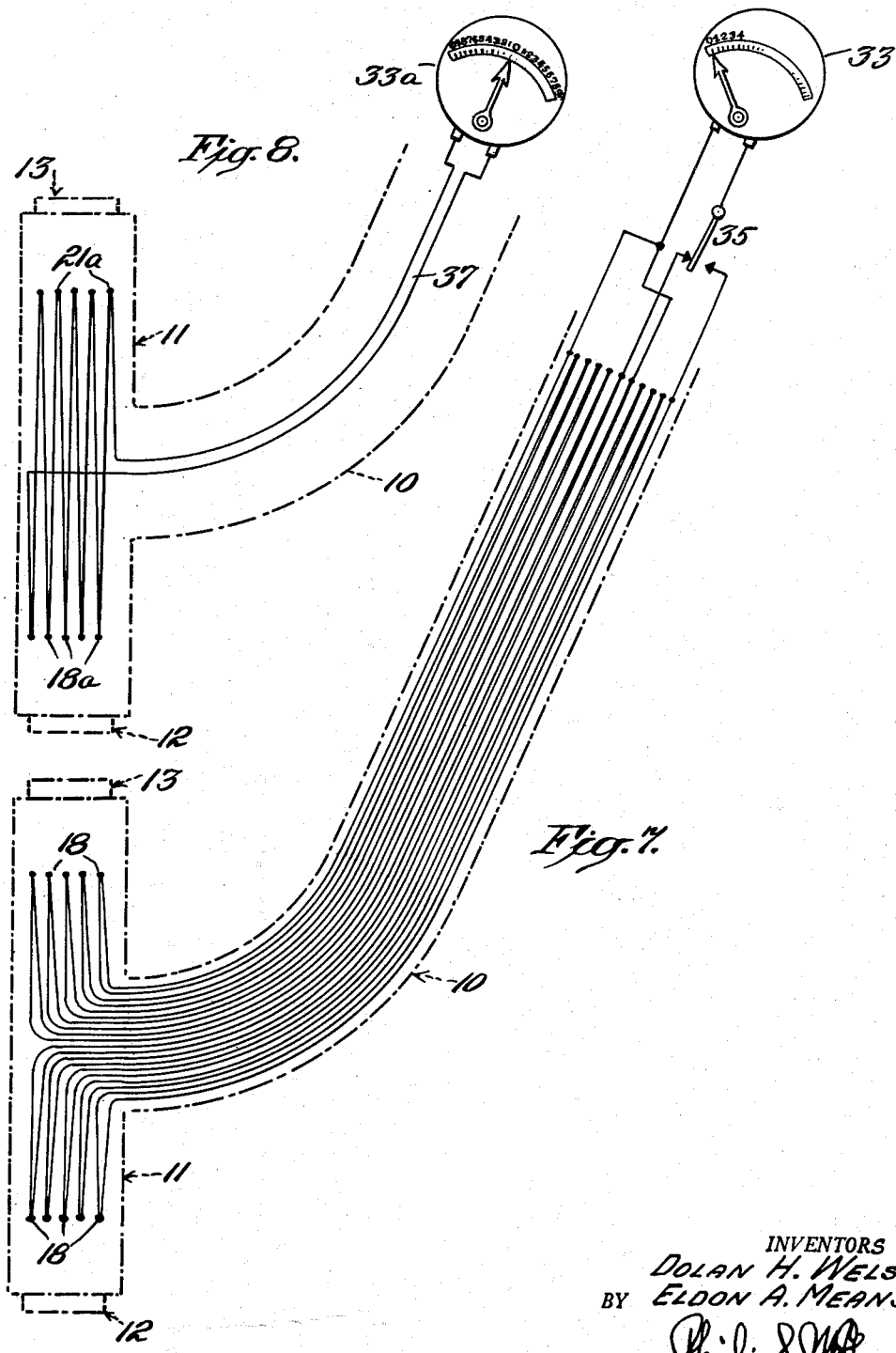

2,614,429

UNITED STATES PATENT OFFICE 2,614,429

GAUGE FOR INDICATING PRESSURE INCREASE CAUSED BY HEAT IN TIRES

Dolan H. Welsh and Eldon A. Means, Wichita, Kans.; said Means assignor to said Welsh Application November 4, 1949, Serial No. 125,598

6 Claims. (Cl. 73—349)

The invention herein disclosed is a gage for showing the pressure developed by heat in a tire.

The ordinary tire gage shows actual pressure, regardless of temperature. If a tire is hot this pressure may be higher than is proper for that tire and yet, actually, the tire be "under inflated."

A tire with insufficient pressure will heat rapidly and thus build up a pressure which on an ordinary tire gage will indicate over inflation.

On testing such a tire, with this reading of too-high pressure, the corrective tendency would be to let out some air and thus further aggravate the heat developing condition of under inflation.

The present invention aims to overcome and prevent such dangerous conditions.

Particularly it is a purpose of the invention to provide an instrument which will show at once the temperature-pressure condition in a tire and thus provide instant information as to whether a tire is riding normally or requires pressure correction one way or another.

Attendant objects of the invention are to provide such instrument in a handy, practical form which will be convenient to use and therefore acceptable to service station attendants and others who usually attend to tire conditions.

Additional objects of the invention are to provide such an instrument in a sturdy form of construction which will stand the handling to which it may be subjected and which with all its advantages, will be a relatively low cost item.

Important objects of the invention are to assure accuracy and reliability, and to this end it is further intended that this new gage be made up of relatively few, simple parts.

Other desirable objects and the novel features through which the purposes of the invention are attained are set forth or will appear in the course of the following specification.

The drawings accompanying and forming part of the specification illustrate certain present practical embodiments of the invention. Actual structure, however, may be further modified and changed as regards the immediate illustration, all within the true intent and broad scope of the invention as hereinafter defined and claimed.

Fig. 1 in the drawings is a broken side elevation of one of the new gages with portions at the lower and upper ends broken away and appearing in section to show the hot junction and cold junction ends, respectively, of the thermocouple which is provided to sense the temperature of the air in a tire;

Fig. 2 is an enlarged broken sectional detail of the lower or hot junction end of the instrument, branched to provide duplicate air chucks for use, respectively, with ordinary tires or for reaching in to use on dual truck tires;

Fig. 3 is an enlarged broken sectional detail of the upper or cold junction end of the instrument;

Fig. 4 is a cross sectional detail as on substantially the plane of line 4—4 of Fig. 3, showing the spool or spreader for the cold junction ends of the thermocouple;

Fig. 5 is an enlarged plan view of one of the insulating holders for the lower, hot junction ends of the thermocouple;

Fig. 6 is a general wiring diagram;

Fig. 7 is a graphic wiring diagram showing the parts more nearly as they are actually disposed in the instrument;

Fig. 8 is a similar view showing a simplified form of wiring system and using one branch of the double-ended air chuck for the cold junctions of a thermocouple, while the other end is used for the hot junctions.

The device is shown in Fig. 1 as a hand tool having an elongated tubular handle 10 terminating at the lower end in an angularly disposed tubular head 11 carrying air chucks 12, 13, at its opposite ends disposed for use, respectively, with ordinary tires or with the less accessible dual truck tires. Each of these air chucks comprises in the illustration, an insulating sleeve 14 having a valve stem engaging stud 15 at the outer end and a screw socket 16 in the inner end for an insulator 17 holding the hot junctions 18 of the thermocouple.

The thermocouple is made up in the case illustrated, (Fig. 6), of companion, dissimilar wires 19, 20, such as copper and "Constantan," each pair connected together at one end as at 18, to form the hot junctions, and connected together at their opposite ends to form the cold junctions 21.

In order that this thermocouple be instantly susceptible and responsive to temperature conditions, very fine wires may be used and the hot and cold junction ends be disposed where they will be immediately effected by tire temperature and by the normal ambient air conditions, respectively.

In the illustration the hot junctions 18 are supported in openings 22 in the insulator 17 so as to stand free in spaced relation in the inner end of the screw socket 16 in the insulating sleeve 14, where they will be subjected to hot air from the tire released through the small passage 23 in the tire valve opening stud 15.

To afford a flow of this hot air past the hot junctions, the wire supporting insulator 17 is shown as having a central vent passage 24 which, as shown in Fig. 2, is open to a vent 25 in the side of the tubular head 11.

The insulating sleeves 14 are shown supported in the opposite ends of the tubular cross head against shoulders 26 by screw rings 27 with gaskets 28 sealing these parts air-tight and providing air-tight seals for engagement over the ends of the tubular tire valves.

The upper, cold junction ends of the thermocouple wires are spaced in separated relation in the illustration, by an insulating spool or spider 29 having slots 30, Figs. 3 and 4, holding and supporting the cold junction ends 21.

This last mentioned insulating spacer is shown as removably secured in position over the upper end of the handle by a hollow screw cap 31, ported in the sides at 32 to freely admit cooling air to the cold junctions.

A quick reading indicator is preferably provided, shown here in the form of a millivoltmeter 33, suitably calibrated at 34 in terms of excess air temperature created pressure values.

This indicator responds to potential developed by the thermocouple and since the pressure increase directly corresponds to temperature increase, the scale may be laid off in pounds so that an observer may read directly the number of pounds developed by temperature in the tire.

A reverse throw switch 35 provided in the wiring connections 36 enables the indicating instrument to be connected selectively with the hot junctions 18 of either the downwardly or the upwardly faced air chucks 13.

While the indicator or gage instrument 33 is shown connected with the thermocouple by a cable 36, it is contemplated that this instrument may be directly mounted on the handle.

Fig. 7 shows diagrammatically how, when the lower air chuck 12 is used, the switch 35 may be shifted to the right to connect the lowermost set of hot junctions at the air chuck 12 in circuit with the gage instrument 33, and be shifted to the left to connect the hot junctions of the upper chuck 13 in circuit with the indicating instrument.

The arrangement disclosed, with the hot junctions at the lower end and the cold junctions at the upper end of the handle, provides desirable spacing of the opposed junctions.

It is contemplated, however, that this spacing may be effected by the distance between the alternately usable air chucks 12 and 13, as shown diagrammatically in Fig. 8 where, when one chuck such as 12 is in use, the junctions 18a thereat will operate as hot junctions and the junctions 21a at the open chuck 13 will serve as cold junctions.

In such a construction a switch may be provided to cut the indicating instrument reversely into proper operating relation to the thermocouple or, as shown in Fig. 8, a double reading instrument 33a may be directly connected by wires 37 to opposite ends of the thermocouple, with the pointer swinging in one direction for one chuck and in the opposite direction for the other chuck.

To use the instrument it is only necessary to press one of the air chucks tightly over the end of the tire valve. In this act the stem of the valve is depressed by the stud 15 to admit tire air through passage 23 direct to the hot junctions 18. This air is permitted to slowly escape through vents 24, 25, Fig. 2, so that these junctions are immediately subjected to the true internal air temperature of the tire. This venting of air past the junctions, however, is so slight as not to bleed the tire to any appreciable extent. Also, the wires are so fine that the reaction is practically instantaneous, or at least without appreciable delay. Consequently, the instrument will give a practically immediate reading showing, for instance, as in the present example, the number of points accumulated in the tire through temperature rise.

The actual increase in temperature may have been occasioned by long continued rough riding, under inflation, misalignment or the like. In any event, the operator is informed that there is an accumulation of pressure due to increase of temperature above that of normal pressure and running conditions.

To assume an example, it may be considered that the instrument, when applied to a tire designed for 24 pounds pressure, shows a temperature-pressure increase of 10 pounds. The pressure on an ordinary tire gage may show at that time, say, 30 pounds. This means that 10 pounds have been accumulated by heat in the tire and that actually the tire is under inflated, instead of being over inflated, as the tire gage indicates. This conclusion is arrived at by deducting the 10 pounds of heat accumulated pressure from the 30 pounds actual, leaving only 20 pounds as the initial or normal pressure, an under inflation of 4 pounds, informing the operator that instead of releasing 6 pounds to bring the tire down to 24, actually he should put in 4 pounds to bring the tire up to the normal 24 pounds it was designed for. By these deductions the tire, instead of being further injured by further under inflation, is, by the addition of 4 pounds extra pressure, brought up to a condition where it will run cool or as intended when operating with its intended 24 pounds inflation.

The gage may be made up in a small, convenient-to-use form and, if desired, the regular type gage may be combined with it as by being made a part of the same handle, so that the user may quickly shift from one to the other instrument when making the comparisons required for restoring proper pressure conditions for the tire.

What is claimed is:

1. A gage for indicating the pressure rise due to temperature increase in a tire, comprising an air chuck for engagement over a tire valve and arranged to effect sampling of the tire-contained air, said air chuck having a chamber arranged to receive the sample air taken from the tire, a thermocouple carried by said air chuck and having a hot junction in said chamber and positioned for contact by the sampled air extracted from the tire and a cold junction positioned for contact by atmospheric air, and an electric potential instrument connected with said thermocouple and calibrated in terms of thermal-pressure increase.

2. A gage for indicating the pressure rise due to temperature increase in a tire, comprising an air chuck for engagement over a tire valve and arranged to effect sampling of the tire-contained air, said air chuck having a chamber arranged to receive the sample air taken from the tire, a thermocouple carried by said air chuck and having a hot junction in said chamber and positioned for contact by the sampled air extracted from the tire and a cold junction positioned for contact by atmospheric air, and an electric potential instrument connected with said thermocouple and calibrated in terms of thermal-pressure increase, said thermocouple including a plurality of hot and cold junctions of fine wire supported in spaced apart relation and said chamber having a small vent to atmosphere for letting hot air sampled from the tire past the hot junctions located in said chamber.

3. A gage for indicating the pressure rise due to temperature increase in a tire, comprising an air chuck for engagement over a tire valve and arranged to effect sampling of the tire-contained air, said air chuck having a chamber arranged to receive the sample air taken from the tire, a thermocouple carried by said air chuck and having a hot junction in said chamber and positioned for contact by the sampled air extracted from the tire and a cold junction positioned for contact by atmospheric air, and an electric potential instrument connected with said thermocouple and calibrated in terms of thermal-pressure increase, said gage having selectively usable air chucks faced in opposite directions and the hot and cold junctions of said thermocouple being disposed in said oppositely faced air chucks and alternately operative as hot and cold junctions, dependent upon which air chuck is applied to a tire valve.

4. A gage for indicating the pressure rise due to temperature increase in a tire, comprising an air chuck for engagement over a tire valve and arranged to effect sampling of the tire-contained air, a thermocouple carried by said air chuck and having a hot junction positioned for contact by the sampled air extracted from the tire and a cold junction positioned for contact by atmospheric air, and an electric potential instrument connected with said thermocouple and calibrated in terms of thermal-pressure increase, said thermocouple being composed of fine wires and an insulating plug supporting the junction ends of the same in spaced apart relation, said plug having a passage therethrough for venting the sampled air past the supported ends of the wires.

5. A gage for indicating the pressure rise due to temperature increase in a tire, comprising an air chuck for engagement over a tire valve and arranged to effect sampling of the tire-contained air, said air chuck having a chamber arranged to receive the sample air taken from the tire, a thermocouple carried by said air chuck and having a hot junction in said chamber and positioned for contact by the sampled air extracted from the tire and a cold junction positioned for contact by atmospheric air, and an electric potential instrument connected with said thermocouple and calibrated in terms of thermal-pressure increase, said gage having a handle and said air chuck being disposed at the end of said handle and having said chamber for containing the sampled air and a valve stem actuating stud provided with a small passage leading to said chamber.

6. A gage for indicating pressure rise due to temperature increase in a tire, comprising an air chuck having an insulating sleeve provided with a valve stem operating stud at the outer end, a socket at the inner end and an air sampling passage extending from said stud to said socket, an insulating plug entered in said socket and having passages therethrough, a thermocouple composed of wires supported in certain of said passages and having hot junction ends supported thereby within said socket, one of said passages being open to pass tire sampled air through said plug, said thermocouple having cold junctions exposed to cooler air and a potential sensing indicator connected with said thermocouple and calibrated in terms of thermal-pressure values.

DOLAN H. WELSH.
ELDON A. MEANS.

REFERENCES CITED

The following references are of record in the file of this patent:

UNITED STATES PATENTS

| Number | Name | Date |
| --- | --- | --- |
| 1,239,769 | Charroin | Sept. 11, 1917 |
| 1,987,642 | Schueler | Jan. 15, 1935 |
| 2,388,542 | Hobbs | Nov. 6, 1945 |
| 2,417,923 | Frisk | Mar. 25, 1947 |